2,762,742

1 - (4 - NITRO PHENYL) - 3 - (2 - PYRIMIDYL) UREA COMPOUND FOR THE TREATMENT OF COCCIDIOSIS AND METHOD OF PREPARING THE SAME

Robert C. O'Neill, New York, N. Y., and Arthur J. Basso, Rahway, N. J., assignors to Merck & Co., Inc., Rahway, N. J., a corporation of New Jersey No Drawing. Application March 11, 1953, Serial No. 341,823

10 Claims. (Cl. 167—53.1)

This invention relates to the treatment of coccidiosis. More particularly it is concerned with novel compositions useful in the treatment of coccidiosis which contain 1-(4-nitrophenyl)-3-(2-pyrimidyl) ureas as the active ingredient. It is also concerned with the preparation of new 1-(4-nitrophenyl)-3-(2-pyrimidyl) ureas useful in such compositions.

The widespread disease complex commonly called "coccidiosis" is caused by several species of protozoan parasites of the genus Eimeria. Thus, the species *E. tenella* is responsible for a severe and frequently fatal infection in the cecum, or blind gut, of chickens. Furthermore, other species of Eimeria and particularly *E. acervulina*, *E. necatrix*, *E. maxima*, and *E. brunetti* cause serious intestinal infections in poultry. When left untreated coccidiosis causes extensive losses to poultry and animal raisers regardless of geographical location. Accordingly, the control of coccidiosis is essential to successful animal husbandry.

Therefore, one object of this invention is to prevent the spread and development of coccidiosis. Another object is to provide novel compositions which can be used to control coccidiosis and methods for preparing such compositions. It is also an object to provide new 1-(4-nitrophenyl)-3-(2-pyrimidyl) ureas which are active against coccidiosis.

According to one embodiment of the present invention novel compositions are provided which are useful against coccidiosis. Thus, it has been found that compositions comprising an active ingredient having the formula

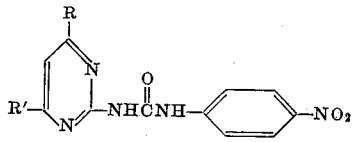

wherein R and R' represent hydrogen and lower alkyl groups, combined with an inert carrier are effective against coccidiosis.

The novel compositions of this invention are readily produced by intimately dispersing one or more of the active 1-(4-nitrophenyl)-3-(2-pyrimidyl) ureas in an inert carrier tolerated by animals and poultry. The carrier can be either a solid or a liquid. The 1-(4-nitrophenyl)-3-(2-pyrimidyl) ureas which are sufficiently soluble in water in water to permit administration of an effective quantity of drug may be supplied to animals in the drinking water. Those compounds which are not sufficiently soluble can be satisfactorily dispersed by the use of materials ordinarily used for this purpose such as emulsifiers, surface active agents, and colloidal materials such as gelatin and methylcellulose. In general though, it is preferred to produce solid compositions since the drugs are more easily dispersed therein. Many different solid materials will function as suitable carriers but those which are inexpensive and readily available are preferred. Some such suitable carriers are ground oyster shells, attapulgus clay, distillers dried grains, and edible vegetable substances such as commercial animal and poultry feeds.

Uniform dispersion of the drug throughout a solid carrier can be readily effected by the usual methods of grinding, stirring, and mixing. By altering the amount of drug added, and the carrier used, compositions of varying concentration can be custom made to suit any purpose.

With particular regard to coccidiosis in poultry, it has been found highly satisfactory to administer the drug incorporated in the normal diet. According to this method of administration coccidiosis in poultry can be effectively treated when birds are placed on a diet containing no more than 0.1%, and as little as 0.0125%, of the active ureas. When administered at such low concentrations the active ureas prevent or substantially reduce the number of deaths due to coccidiosis and simultaneously reduce or destroy the infection while the poultry maintains a high weight gain. However, larger quantities of drug may be administered if a highly virulent outbreak of the disease is encountered. Furthermore, compositions containing these active ureas can be used therapeutically and also prophylactically.

The coccidiostatic activity of representative 1-(4-nitrophenyl)-3-(2-pyrimidyl) ureas was experimentally demonstrated according to the following test.

Groups of ten two-weeks old chicks were placed on a diet of mash feed containing a predetermined quantity of the drug to be tested. Each chick was then inoculated with 50,000 oocysts 24 hours after administration of the drug began. Control groups of ten chicks were also infected but fed a normal, non-medicated diet. After the diets were administered for eight days the test was terminated and the survivors sacrificed. The following results were obtained by the application of this testing procedure:

| Drug | Percent of Diet | Percent Mortality | | Percent Weight Gain | | Number of Oocysts ×10⁶ in Surviving Animals | |
|---|---|---|---|---|---|---|---|
| | | Treated | Untreated | Treated | Untreated | Treated | Untreated |
| 1-(4-nitrophenyl)-3-(2-pyrimidyl) urea | 0.05 | 10 | 45 | 70 | 27 | 13.8 | 16.1 |
| | 0.1 | 0 | 45 | 55 | 27 | 4.8 | 16.1 |
| 1-(4-nitrophenyl)-3-[2-(4,6-dimethylpyrimidyl)] urea | 0.1 | 0 | 25 | 95.4 | 42.7 | 1.4 | 20.0 |

From these results it is seen that the 1(4-nitrophenyl)-3-(2-pyrimidyl) ureas are capable of greatly reducing coccidiosis infections while maintaining a satisfactory growth rate and substantially preventing deaths due to this disease.

Compositions useful in the treatment of coccidiosis may also be prepared containing, in addition to at least one active 1-(4-nitrophenyl)-3-(2-pyrimidyl) urea combined with a suitable carrier, other coccidiostats which are presently available such as sulfaquinoxaline, 3,3'-dinitrodiphenyldisulfide, arsenicals, and combinations of the ordinary therapeutically useful sulfa drugs. One such composition suitable for use in the control of coccidiosis in poultry comprises 0.05% of 1-(4-nitrophenyl)-3-[2-(4,6-dimethylpyrimidyl)] urea and 0.05% of sulfaquinoxaline combined with a feedstuff.

The active urea derivatives used in the production of these novel compositions can be prepared by reacting 4-nitrophenyl isocyanate with the appropriate 2-aminopyrimidine according to the following reaction:

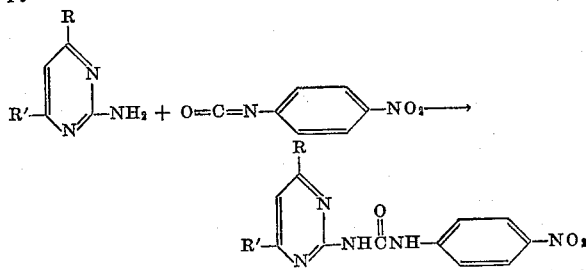

wherein R and R' represent hydrogen and lower alkyl groups. 4-nitrophenyl isocyanate is a commercial product and is therefore readily obtained. In addition, 2-aminopyrimidine and nuclear alkyl derivatives thereof such as 2-amino-4-methylpyrimidine, 2-amino-4,6-dimethylpyrimidine, 2-amino-4-propylpyrimidine, and 2-amino-4,6-diethyl pyrimidine may also be obtained from commercial sources or by procedures disclosed in the literature.

The reaction is conveniently effected by intimately contacting the reactants in a suitable neutral inert organic solvent. The solvent may contain small amounts of water but, in general, it is preferred to use anhydrous conditions to obtain highest yields of the desired products. Examples of inert solvents suitable for the reaction, and which can be easily dried if desired, are carbon tetrachloride, toluene, ether, dioxane, benzene, xylene and the like. The reaction proceeds readily at room temperature although elevated temperatures such as 60° C. and above may be used if desired. The resulting 1-(4-nitrophenyl)-3-(2-pyrimidyl) ureas are essentially insoluble in most solvents and are easily recovered by conventional methods, such as filtration. In a specific embodiment of this process 1-(4-nitrophenyl)-3-[2-(4,6-dimethylpyrimidyl)] urea is prepared by reacting 4-nitrophenyl isocyanate with 2-amino-4,6-dimethylpyrimidine while 1-(4-nitrophenyl)-3-[2-(4-methylpyrimidyl)] urea is obtained by reacting 4-nitrophenyl isocyanate with 2-amino-4-methylpyrimidine. Other representative compounds which are prepared in this manner are 1-(4-nitrophenyl)-3-[2-(4-propylpyrimidyl)] urea, 1-(4-nitrophenyl)-3-[2-(4,6-diethylpyrimidyl)] urea and 1-(4-nitrophenyl)-3-[2-(4-butylpyrimidyl)] urea.

The following examples illustrate the process in more detail.

EXAMPLE 1

*Production of 1-(4-nitrophenyl)-3-(2-pyrimidyl) urea*

To a solution of 7.6 gm. of 2-aminopyrimidine in 80 ml. of dry dioxane was added a solution of 13.1 gm. of 4-nitrophenyl isocyanate in 40 ml. of dry dioxane. The mixture was stirred for 10 minutes and then filtered to obtain the 1-(4-nitrophenyl)-3-(2-pyrimidyl) urea. The product was washed with dioxane and then ether. It melted within the range 280–290° C.

EXAMPLE 2

*Production of 1-(4-nitrophenyl)-3-[2(4,6-dimethylpyrimidyl)] urea*

To a solution of 16.4 gm. of 4-nitrophenyl isocyanate in 50 ml. of dry dioxane was added 12.3 gm. of 2-amino-4,6-dimethylpyrimidine. The reaction mixture was stirred for 15 minutes and filtered to obtain the 1-(4-nitrophenyl)-3-[2(4,6-dimethylpyrimidyl)] urea. The product was washed with dry dioxane and then anhydrous ether. It melted at 269–270° C.

What is claimed is:

1. A composition useful in the treatment of coccidiosis which comprises an active ingredient of the formula

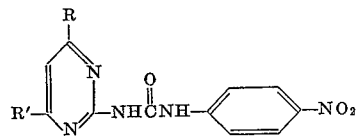

and an inert carrier, R and R' representing members selected from the group consisting of hydrogen and lower alkyl radicals.

2. A composition according to claim 1 in which the carrier is an animal feedstuff.

3. A composition useful in the treatment of coccidiosis which comprises 1-(4-nitrophenyl)-3-(2-pyrimidyl) urea combined with an animal feedstuff.

4. A composition useful in the treatment of coccidiosis which comprises 1-(4-nitrophenyl)-3-[2-(4,6-dimethylpyrimidyl)] urea combined with an animal feedstuff.

5. A compound having the formula

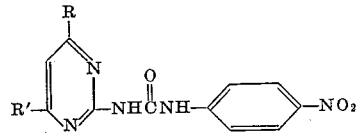

wherein R is a lower alkyl radical and R' is a member selected from the group consisting of hydrogen and lower alkyl radicals.

6. 1-(4-nitrophenyl) - 3 - [2(4,6-dimethylpyrimidyl)] urea.

7. 1-(4-nitrophenyl)-3-(2-pyrimidyl) urea.

8. The process of preparing compounds of the formula

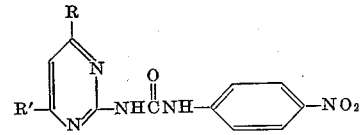

which comprises reacting a compound of the formula

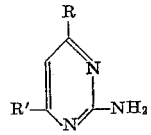

with 4-nitrophenyl isocyanate in a neutral organic solvent, in each occurrence R representing a lower alkyl radical and R' representing a member selected from the group consisting of hydrogen and lower alkyl radicals.

9. The process of preparing 1-(4-nitrophenyl)-3-[2(4,6-dimethylpyrimidyl)] urea which comprises reacting 2-amino-4,6-dimethylpyrimidine with 4-nitrophenyl isocyanate in a neutral organic solvent.

10. A composition useful in the treatment of coccidiosis which comprises an active ingredient of the formula

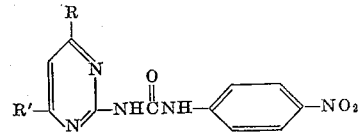

sulfaquinoxaline, and an inert carrier, R and R' representing members selected from the group consisting of hydrogen and lower alkyl radicals.

No references cited.